United States Patent [19]
Chiaretti et al.

[11] Patent Number: 5,181,264
[45] Date of Patent: Jan. 19, 1993

[54] TRANSCEIVER FOR BIDIRECTIONAL SIGNAL TRANSMISSION OVER A MONOMODAL OPTICAL FIBER

[75] Inventors: Guido Chiaretti, Novate Milanese; Francesco Blandano, Corbetta, both of Italy

[73] Assignee: Italtel Societa Italiana Telecomunicazioni S.p.A., Milan, Italy

[21] Appl. No.: 731,147

[22] Filed: Jun. 21, 1991

[30] Foreign Application Priority Data

Dec. 22, 1988 [IT] Italy ............................... 23056 A/88

[51] Int. Cl.$^5$ ............................ G02B 6/32; G02F 1/00; B31B 1/60
[52] U.S. Cl. .......................................... 385/33; 385/34; 385/51; 385/93; 359/152; 359/173; 156/60; 156/158
[58] Field of Search ........................ 385/34, 33, 42, 38, 385/47, 51, 93, 94; 359/115, 131, 152, 154, 173, 188, 195; 156/60, 158

[56] References Cited

U.S. PATENT DOCUMENTS

| | | | |
|---|---|---|---|
| 4,213,677 | 7/1980 | Sugimoto et al. | 385/34 |
| 4,362,359 | 12/1982 | Dammann et al. | 359/130 |
| 4,550,975 | 11/1985 | Levinson et al. | 385/34 |
| 4,592,619 | 6/1986 | Weidel | 385/14 |
| 4,718,055 | 1/1988 | Winzer | 359/131 |
| 4,880,289 | 11/1989 | Imoto et al. | 359/131 |
| 5,050,953 | 9/1991 | Anderson et al. | 385/33 X |
| 5,064,299 | 11/1991 | Hirschmann et al. | 385/33 |
| 5,074,682 | 12/1991 | Uno et al. | 385/33 X |

Primary Examiner—Brian Healy

[57] ABSTRACT

A circuit arrangement is provided for allowing the bidirectional exchange of received and transmitted signals over a single monomodal optical fiber. The light transmitter (usually a laser or a LED), the receiver of optical signals and an optical system suitable for directing the optical signal to be transmitted to the monomodal optical fiber ad for directing the optical signal from the monomodal optical fiber to the receiver collects the signals in one passage. The optical system uses an optical transceiver employing a light transmitter and a light receiver. This optical transceiver is formed in a unitary housing. The optical system includes first and second lenses which may be graded-index waveguide sections and a planar filter disposed therebetween, the planar filter typically being an interferential filter. The optical system is formed on a support which allows the light transmitter which is typically a laser to be disposed directly adjacent one of the lenses. The surface of the lens abutting the optical communication fiber and optical stub is angled with respect to perpendicular to the axis of the symmetry of the optical system to prevent reflected optical power from entering the light transmitter, particularly when it is a laser, hereby reducing noise and instability within the laser source.

11 Claims, 2 Drawing Sheets

TRANSCEIVER FOR BIDIRECTIONAL SIGNAL TRANSMISSION OVER A MONOMODAL OPTICAL FIBER

This application is a Continuation-In-Part of PCT U.S. Pat. application Ser. No. PCT/EP89/01420 filed Nov. 23, 1989. The entire contents of which are hereby incorporated by reference.

FIELD OF THE INVENTION

The present application is directed to an optical interface assembly and a transceiver formed therefrom for use in bidirectional signal transmission over an optical fiber communication path.

BACKGROUND OF THE INVENTION

A passive optical interface element, used in optical systems in which three lengths of monomodal optical fiber are connected to the optical interface element, is known in literature and available on the market. An interface assembly incorporating such an interface element utilizes connectors to connect various active components and assembly elements to the monomodal optical fibers which are in turn used to interconnect the various interface assembly elements and active components together optically.

As is well known by any person skilled in the art, the lengths of monomodal optical fibers used to connect the various interface assembly elements and active components together in an optical system should have a length of not less than 60-100 cm. and cannot be curved or bent very tightly. This is because monomodal optical fibers having a length of less than about 50-60 cm. become multimodal. Additionally when the bending radius of an optical fiber becomes too tight, the optical losses become excessive. Consequently the passive optical interface assembly has significant dimensions due to the additive, dimensions of the connectors, the active components, the passive interface elements and the lengths of optical fiber connecting the active components (receiver and laser) to the passive elements.

The above described transceiver system of known type is therefore very bulky and expensive. Additionally, the correct positioning of all lengths of optical fiber with respect of the active components and the passive elements must be performed manually by qualified staff and requires rather long alignment times with a consequent low yield in the production process.

U.S. Pat. No. 4,592,619 discloses an optical transceiver module for a light transmitter and a light receiver to a single multimode optical fiber. This device uses two separated and different conventional lenses, namely a spherical lens and a planoconvex lens together with a planar filter interposed between them. The paths of the optical beams within the housing are through the air or other medium the housing is filled with.

Such known couples have the disadvantage of requiring a fine and difficult three-dimensional positioning of the members, as well as of requiring the physical means to accomplish this three dimensional positioning. The cost thereof is further raised by the use of two different kind of lenses in the optical system. Such device is subject to misalignment losses due for example to vibrations, changes of mechanical dimensions due to temperature changes, and changes of the refractive index of the medium within the housing (which may be caused, for example, by temperature changes or sealing defects of the housing).

OBJECTS AND SUMMARY OF THE INVENTION

An object of the present invention is to overcome the above drawbacks and shortcomings using single mode fibers.

Accordingly, the present invention is directed to a circuit arrangement allowing the bidirectional exchange of received and transmitted signals over a single monomodal optical fiber. The invention collects in one package the light transmitter (usually a laser or a LED), the receiver of optical signals and an optical system suitable for directing the optical signal to be transmitted to the monomodal optical fiber and for directing the optical signal from the monomodal optical fiber to the receiver.

As required by any bidirectional transmission system utilizing only a single optical fiber, the two signals (received and transmitted) should differ in frequency or wavelength.

The optical system of the present invention is utilized in optical transceiver employing a light transmitter and a light receiver as well as the optical system. This optical transceiver is formed in a unitary housing. The optical system includes first and second lenses which may be graded-index waveguide sections and a planar filter disposed therebetween, the planar filter typically being an interferential filter. According to the teachings of the present application, the optical system is formed on a support which allows the light transmitter which is typically a laser to be disposed directly adjacent one of the lenses. The support further constrains the positioning of both the optical communication fiber and an optical stub fiber in the proper position abutting the other lens. The light receiver is disposed at the other end of the optical stub and is surrounded by a cap which shields the receiver from light from the transmitter.

The surface of the lens abutting the optical communication fiber and optical stub is angled with respect to perpendicular to the axis of the symmetry of the optical system to prevent reflected optical power from entering the light transmitter, particularly when it is a laser, hereby reducing noise and instability within the laser source.

The present application is further directed to a method of securing the optical communication fiber and optical stub in the proper position in abutment with the appropriate lens of the optical system in a fashion so as to simplify the construction of the optical transceiver of the present invention.

BRIEF DESCRIPTION OF THE DRAWINGS

The present invention may be better understood with the aid of the attached drawing figures wherein.

DETAILED DESCRIPTION OF THE PREFERRED EMBODIMENTS

Figure 1:
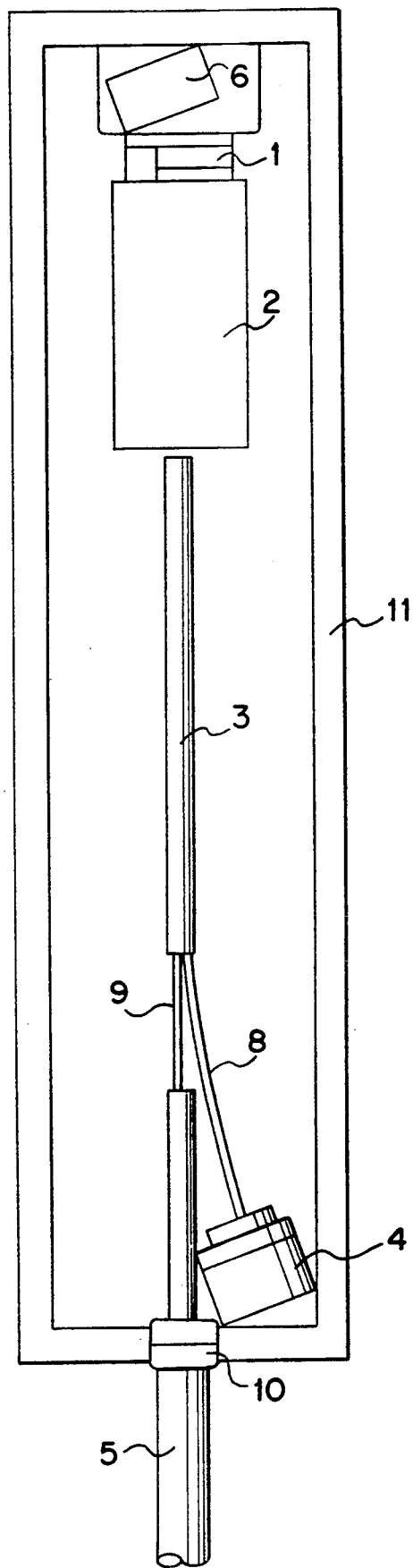
FIG. 1 shows schematically a transceiver according to the invention.

In FIG. 1, a laser 1 generates an optical signal to be transmitted which is provided to an optical system 2. The receiver 4 for optical signals is provided within a package 11 as is the laser 1 and the optical system 2. Element 5 designates a monomodal optical fiber on which the bidirectional transmission of the optical signals, both from the laser 1 and to the receiver 4. The optical fiber 5 terminates in a terminal position 9 thereof and is connected to the transceiver realized according to the invention by means of a through bush 10 fixed on the wall of package 11 enclosing the transceiver.

An example of realization of the filtering optical system 2 will be discussed with reference to FIG. 3. In the embodiment of this FIG., as a consequence of the usage of such type of optical system, laser 1 has been mounted displaced with respect to the axis of symmetry S of the optical system 2.

With reference to FIG. 1, the terminal part 9 of the; monomodal optical fiber 5 is inserted and fixed in a capillary 3 together with a length of optical fiber or optical fiber stub 8 to which the optical receiver 4 is connected. The positioning of fibers 8 and 9 with respect to the optical system 2 will be discussed with reference to the example of realization of FIGS. 3 and 4.

The various optical components (fibers 8 and 9, optical system 2, laser 1, receiver 4, etc.) are "stuck" or glued together in the illustrated arrangement by means of one of the optical cements available on the market. Fibers 8,9 are securely positioned at a location defined by abutment the face 20a of a groove block 20 and the optical fibers 8, 9 extend to abut the face 12a of lens 12 in one dimension and are further located by gluing the fibers 8, 9 in a groove 25 provided in a fiber support, schematically illustrated in FIG. 3 and shown in greater detail in FIG. 4 as will be later described. The laser 1 is similarly secured in front of the face 13a of a lens 13.

FIG. 1 also shows an optical detector 6, placed close to laser 1, which is provided for informing a control circuit, if any, of the transmission system about the state (on/off) of laser 1. It should be understood that the use of the optical detector 6 is not necessary for the correct operation of the transceiver according to the invention.

The terminals of the active elements (laser 1, receiver 4, detector 6, if any), present on the transceiver, have been omitted from FIG. 1 for simplicity's sake; moreover the transceiver should be protected from weather and/or any pollutant agents by making the package 11 air tight.

Figure 2:
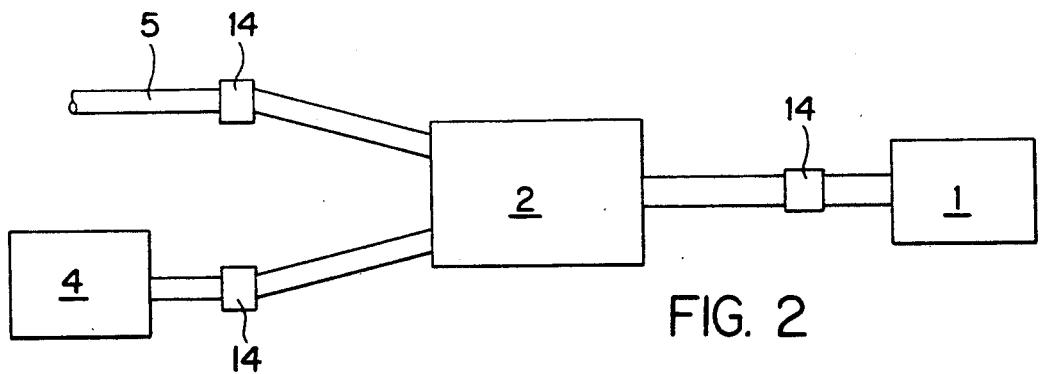
FIG. 2 shows schematically a bidirectional transmission system of known type.

FIG. 2 shows schematically a bidirectional transmission system of a known type, formed primarily of 3 separate elements, a discrete component laser 1, connected to an optical fiber length, a discrete component receiver 4, connected to another optical fiber length, and a passive component, containing the optical system 2 connected by three optical fiber lengths to connectors 14 which connect the passive component to, respectively, the monomodal optical fiber 5 and the optical fiber lengths connected to laser 1 and to detector 4. The system of FIG. 2 is much more bulky and expensive than the hybrid module of FIG. 1.

In Fact, laser 1 and receiver 4, realized as separate active elements apart, have dimensions comparable to those of a transceiver of the invention. Moreover, each active element is connected to a length of optical fiber, the correct positioning of which is expensive as the passive element has a significant size, often much greater than that of the active elements (laser, receiver), since, as already explained, each of the three lengths of optical least fiber connecting the optical system 2 to connectors 14 should be at least 60-100 cm. long and cannot be tightly curved.

By inserting the active elements in a single package 11 (FIG. 1) the invention avoids the two lengths of optical fiber and the relevant connector that, in the prior device, connect laser 1 to optical system 2. Moreover, only one positioning and welding operation is required (of laser 1 in respect of optical system 2), thus halving the burden of the double optical system-fiber and fiber-laser positioning required by the known device.

The arrangement of the present invention connects the receiver 4 to the optical system 2 by a very short optical fiber stub 8 (for instance 1-5 cm.), thus avoiding the related connector and one of the positioning operations required by the prior system. In fact, during operation of the transceiver of the invention, it is possible to ignore the behavior (monomodal or multimodal) of the optical fiber 8 due to its short length. In the known solution of FIG. 2, the optical fiber length connected to the receiver 4 is monomodal and, therefore, also the corresponding optical fiber length connected to the optical system 2 should be monomodal.

The present invention enables remarkable savings of material (optical fiber and connectors) as well as a reduction of construction time and cost with the consequent increase of the yield of the manufacturing process and the decreased dimensions of the transceiver assembly constructed according to the teachings of the present invention. These advantages are of great importance, since this is a component will be frequently employed in telephone exchanges and transmission systems in general.

Figure 3:
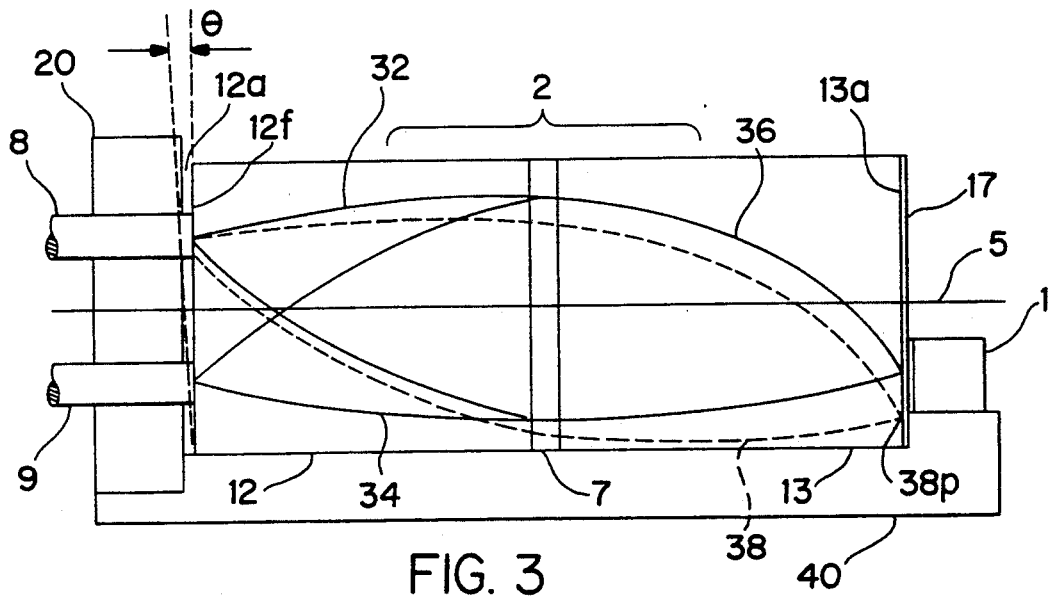
FIG. 3 an example of the optical system 2 of the present invention of FIG. 1.

FIG. 3 shows an example of realization, of the optical system 2, including two lenses 12, 13 of the "Selfoc" type, which are graded-index waveguide sections. Such lenses are well known in the art of fiber optic communication. An optical filter 7, in the preferred embodiment an optical interference filter is provided between the graded-index waveguide sections which are juxtaposed thereto. Filter 7 has a frequency characteristic which is transparent for the signal $\lambda_1$ to be transmitted issued by laser 1. The filter 7, however, reflects a signal having the wave length $\lambda_2$ of the signal received from the optical communication fiber 5 to its terminal end 9, which different from the wavelength $\lambda_1$, of the signal to be transmitted, the portion of said received signal of wave length $\lambda_2$ transmitted by the filter 7 being attenuated by 30dB.

It should be remembered that the "Selfoc" lens 12, to which a beam of luminous rays is applied on the inlet face disperses the received beam into a beam the width of which depends on the physical characteristics of the lens itself and vice versa.

With reference to the diagram of FIG. 3, the luminous ray generated by laser 1 is dispersed by lens 13 with a pattern 36, passes through filter 7 and is refocalized by lens 12 with a pattern 32 on the optical fiber 9, placed in a symmetric position with respect of laser 1 with reference to the axis of symmetry S of the optical system 2.

The signal to be received, coming from the optical fiber 9, is dispersed by lens 12 with the pattern 32, is reflected by filter 7 and refocalized by the same lens 12 with a pattern 34 in a symmetric point in respect of the axis of symmetry S, where it is collected by the optical fiber 8. Receiver 4 is therefore isolated from laser 1.

In the preferred embodiment, the planar graded-index waveguide is provided with wide aperture, preferably greater than 40° in order to collect a greater quantity of the light emitted by the laser 1. In the preferred embodiment, the lens 13 is further provided with an anti-reflective coating 17. Preferably the planar graded-index waveguide 12 is provided with a smaller aperture in order to better concentrate the light to be transmitted into the monomodal optical fiber 9. This lens 12, according to the teachings of the present invention, has a surface which is lapped or ground at an angle $\theta$ which, in the preferred embodiment, is to be 8° in order to reduce the reflected optical power from this surface toward the laser. Through the use of the lap surface 12f set at the angle $\theta$, any reflected optical power from the surface 12f is reflected along the optical path 38 as shown in dashed lines in FIG. 3 which focuses any such reflected light to a point 38p remote from the laser 1.

For the correct working of the optical system 2, the optical fibers 8 and 9 are applied, on the same side of the optical system 2, in positions equally distant from the axis of symmetry of the optical system 2, while laser 1 is applied on the other side of the optical system 2 opposite to optical fiber 8.

Figure 5:
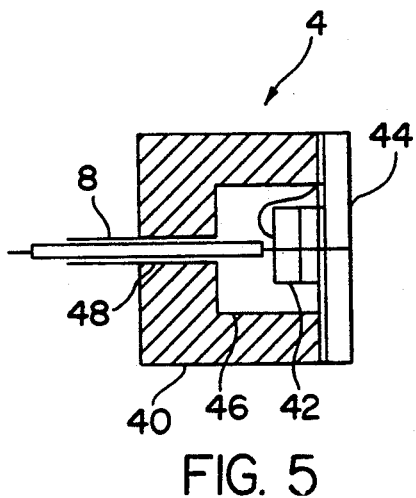
FIG. 5 details the construction of the optical receiver 4 of the present invention.

Referring now to FIG. 5, the receiver 4 of the preferred embodiment will now be described. The receiver 4 of the present invention comprises a photodiode 42 provided on a submount 44. Further, a cap 40 is provided in abutting relationship with the submount 44 to form a cavity 46 within which the photodiode is disposed. A passage 48 sized to the optical fiber 8 is provided to enable the insertion of the optical fiber 8 into the cavity 46. In the preferred embodiment, the cap 40 is made of alumina and is provided with metalized surfaces, not shown, to enable electrical connection of the photodiode to the external surface of the cap. The cap 40 is opaque and effectively shields the receiver from any light within the package 11, thereby decoupling the receiver from the transmitter. In the preferred embodiment, the cap is coated with a non-conductive opaque resin to ensure decoupling.

The present application is also directed to the method of making the optical system 2 as illustrated in FIG. 3. According to the teachings of the present invention, the Selfoc lenses 12, 13 are glued, using an optical cement to the opposed faces of the interference filter 7. Desirably, according to the teachings of the present invention, Selfoc lens 12 of the present invention is lapped to produce the angle $\theta$ and Selfoc lens 13 is coated with an anti-reflective coating 17 prior to gluing the Selfoc lenses 12, 13 to the interference filter 7.

Figure 4:
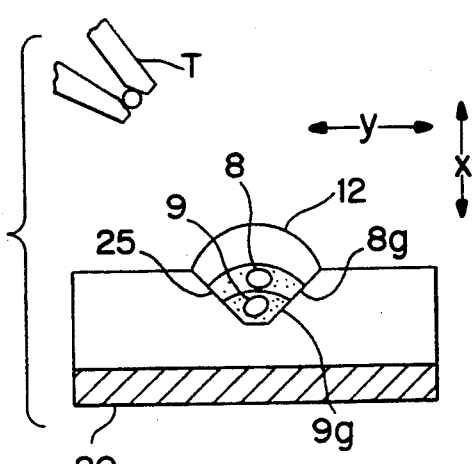
FIG. 4 schematically illustrates the affixing of the optical fibers 8, 9 in proper position adjacent lens 12.

A support 40 of which a groove block 20 is a part, is schematically illustrated in FIG. 3. This support facilitates precise positioning of the laser, optical system, and fibers and is produced with strict tolerances. This support is provided with the groove block 20 which aides in the positioning of the optical fibers as is best illustrated in FIG. 4. As illustrated in FIG. 4, the groove block 20 is provided with a groove 25 receiving the optical fibers 8 and 9 and locating them in two axes, symmetrical with the axis of symmetry S of the Selfoc lens 12.

The optical fibers 8 and 9 are fastened into the groove 25 of the groove block 20 in abutment with the lens 12 in the following manner. Tweezers T are used to place the optical fiber 9 into the groove 25 in abutment with the face 12f of lens 12. Optical fiber 9 is then moved in the x and y axes in order to locate the position of maximum optical coupling. Optical fiber 9 is then glued in place with glue 9g. Subsequently, tweezers T are used to locate optical fiber 8 in position in abutment with the face 12f of lens 12 within the groove 25. Optical fiber 8 is then moved in the x and y axes in order to locate the position of maximum optical coupling. Optical fiber 8 is then fastened with glue 8g. The securing of the optical fibers in this manner allows the Selfoc lens to locate the fibers in one axis while the v groove constrains the fibers in the x and y axes as illustrated in FIG. 4. Accordingly, the optical fibers may be mounted to the optical system 2 relatively simply and without the requirement of considerable skilled operator effort, therefore providing a considerable advantage to the method of the present invention.

Without exceeding the scope of the invention it is possible to realize an optical transceiver according to the teachings of the present application by using multimodal fibers rather than monomodal fibers. Alternatively, the optical system 2 illustrated in FIG. 3 may be replaced with another type of equivalent optical system.

It should be understood that the specific embodiments of the invention described herein are illustrative only and should not be considered limitative. Any changes or improvements suggested by the evolution of the technology of the optical fiber are within the scope of the invention defined solely by the appended claims.

We claim:

1. An optical transceiver for receiving and transmitting information optically over a single optical communication fiber, comprising:
   a housing;
   a light transmitter disposed in said housing for emitting a first wavelength of light for transmission over the optical communication fiber;
   a light receiver disposed in said housing for receiving a second wavelength of light from the single optical communication fiber; and
   an optical system disposed in said housing for directing the first wavelength of light from said light transmitter to the single optical communication fiber and for directing the second wavelength of light from the single optical communication fiber to said light receiver, said optical system including,
   a first lens,
   a second lens,
   a planar filter disposed between said first and second lenses,
   said first and second lenses each having a first face confronting said planar filter and a second face for communicating optical information;
   said light transmitter being positioned in front of the second face of said first lens;
   wherein a terminal part of the single optical communication fiber is connected to said optical system and an optical fiber stub connects said optical system to said light receiver, such that said light transmitter, said light receiver, and said optical system are connected via the single optical communication fiber within said housing;
   said optical fiber stud and the single optical communication fiber being mounted on a support in juxtaposition with the second face of said second lens, thereby constraining the positions of said light transmitter, said light receiver, and said optical system with respect to each other, within said housing.

2. The optical transceiver as claimed in claim 1, wherein said first and second lenses are graded index waveguide sections with said planar filter being juxtaposed therebetween.

3. The optical transceiver as claimed in claim 1, wherein a equal length of said optical fiber stud and the single optical communication fiber are disposed within a capillary tube adjacent said support.

4. The optical transceiver as claimed in claim 1, further comprising an optical detector mounted adjacent to said light transmitter and detecting a state of said light transmitter and providing an indication thereof to a monitoring system located outside said housing.

5. The optical transceiver of claim 2 wherein said optical system has an axis of symmetry extending along a centerline of said first and second lenses and said planar filter, said second surface of said second lens forming an angle with respect to said axis of symmetry.

6. The optical transceiver of claim 1 wherein said first and second lenses and said planar filter are glued together.

7. The optical transceiver of claim 1 wherein said planar filter is an optical interference filter.

8. The optical transceiver of claim 1 wherein said light transmitter is a laser.

9. The optical transceiver of claim 8 wherein said receiver includes a photodiode and a cap surrounding said photodiode for optically isolating said photodiode from said laser.

10. A method of affixing a monomodal optical fiber to an optical system for use in an optical transmission system wherein said optical system has a planar lens communicating via said monomodal optical fiber, comprising;

providing a grooved support adjacent said planar lens as part of said optical system;

abutting said monomodal optical fiber against said planar lens to locate it is a first dimension;

locating said monomodal optical fiber in second and third dimensions by positioning said monomodal optical fiber within the groove of said grooved support; and gluing said monomodal optical fiber into position.

11. The method of claim 10 further comprising:

abutting an optical fiber stub against said planar lens to locate the optical fiber stub in the first dimension;

locating the optical fiber stub in second and third dimensions by positioning the optical fiber stud within the groove of said grooved support over the monomodal optical fiber; and gluing the optical fiber stud into position.

* * * * *